United States Patent [19]

Wolf et al.

[11] Patent Number: 4,851,645
[45] Date of Patent: Jul. 25, 1989

[54] DEVICE FOR DETERMINING THE TEMPERATURE OF A GLASS CERAMIC PLATE HEATED BY MEANS OF HEAT COILS OR HALOGEN LAMPS

[75] Inventors: Kurt Wolf; Wolfram K. Andre, both of Wildbad, Fed. Rep. of Germany

[73] Assignee: Fissler GmbH, Fed. Rep. of Germany

[21] Appl. No.: 153,071

[22] Filed: Feb. 8, 1988

[30] Foreign Application Priority Data

Feb. 7, 1987 [DE] Fed. Rep. of Germany ....... 3703768

[51] Int. Cl.⁴ .............................................. H05B 3/74
[52] U.S. Cl. ..................................... 219/464; 219/449; 219/460
[58] Field of Search ............... 219/464, 448, 449, 450, 219/457, 458, 459, 460, 463, 467

[56] References Cited

U.S. PATENT DOCUMENTS

| | | | |
|---|---|---|---|
| 3,624,352 | 11/1971 | Deaton | 219/464 |
| 4,388,520 | 6/1983 | McWilliams | 219/464 |
| 4,447,710 | 5/1984 | McWilliams | 219/460 |
| 4,447,711 | 5/1984 | Fischer | 219/464 |
| 4,518,850 | 5/1985 | Grasso | 219/464 |

FOREIGN PATENT DOCUMENTS 2258760 6/1974 Fed. Rep. of Germany ...... 219/449

Primary Examiner—Teresa J. Walberg
Attorney, Agent, or Firm—Thomas W. Speckman; Douglas H. Pauley

[57] ABSTRACT

A device for determining the temperature of a glass ceramic plate heated using heat coils or halogen lamps with a temperature sensor which emits a signal for a control circuit corresponding to the temperature of the glass ceramic plate. The heat coils or the halogen lamps are positioned in the internal space of a cylindrical vessel-like insulation support, and in which the surrounding wall of the insulation body, under spring tension, abuts on the glass ceramic plate heated by the radiation of the heating coils or the halogen lamps. Adequate control precision can be achieved by having the temperature sensor positioned in a recess in the surrounding wall of the insulation body, and is in a thermally-conductive connection with the lower side of the glass ceramic plate. The recess for the temperature sensor is positioned at a distance to the internal space of the insulation support and thus the dynamics of the control behavior can be adjusted to low hysteresis and optimized.

9 Claims, 2 Drawing Sheets

DEVICE FOR DETERMINING THE TEMPERATURE OF A GLASS CERAMIC PLATE HEATED BY MEANS OF HEAT COILS OR HALOGEN LAMPS

BACKGROUND OF THE INVENTION

1. Field of the Invention

A device for determining the temperature of a glass ceramic plate heated with heat coils or halogen lamps using a temperature sensor which emits a signal for a control circuit corresponding to the temperature of the glass ceramic plate, in which the heat coils or the halogen lamps are positioned in the internal space of a cylindrical vessel-like insulation support, and in which the edge of the insulation body, under spring tension, abuts on the glass ceramic plate heated by the radiation of the heat coils or the halogen lamps.

2. Description of the Prior Art

Such types of devices are in particular used in cooking stoves in which the glass ceramic plate extends over several heating positions predetermined by the position of the insulation support with the heat coils or the halogen lamps. The temperature sensor is also accommodated in the internal space of the insulation support, and heated by the irradiation emitted by the heat coils or the halogen lamps. Since the temperature sensor can follow the temperature changes determined by the switching on and switching off of the heat coils or the halogen lamps more rapidly than the glass ceramic plate, there arise brief control oscillations in the control circuit. If the temperature sensor outside the internal space of the insulation body is brought into heat-conducting connection with the glass ceramic plate, then the brief temperature elevations conditioned by the switching on and switching off the heat coils or the halogen lamps exert little influence on the temperature sensor, since it is only heated by means of the glass ceramic plate. Through the inertia of the glass ceramic plate, that is, its thermal conductivity, a delay arises in the heating of the temperature sensor, which leads to undesirable control characteristics with significant hysteresis. In both cases, sufficient precision cannot be achieved for control of the temperature of the glass ceramic plate.

If the temperature sensor is accommodated in a thermally insulated manner in the internal space of the insulation support, then a portion of the surface of the glass ceramic plate is lost for heating by means of the irradiation.

SUMMARY OF THE INVENTION

It is an object of the invention to provide a device of the type already stated, by means of which both the brief temperature changes caused by the switching on and switching off of the heat coils or the halogen lamps, as well as the long-term temperature changes on the temperature sensor conditioned by the thermal conductivity of the glass ceramic plate, are eliminated, or at least so reduced that their influences on the control precision are negligible for the temperature of the glass ceramic plate, without the glass ceramic plate having a disrupting, unheated surface in the area enclosed by the insulation support.

This object is achieved in accordance with the invention through the fact that the temperature sensor is positioned in a recess in the edge of the insulation body and is in thermally conductive connection with the lower side of the glass ceramic plate, and that the recess for the temperature sensor is positioned at a distance from the internal space of the insulation support, by means of which the dynamics of the control behavior is adjusted to small hysteresis and optimized.

In this arrangement of the temperature sensor, influence from the irradiation produced by the heat coils or the halogen lamps is avoided, and the temperature sensor is only heated through the thermal conductivity of the glass ceramic plate. In this manner, the temperature sensor still remains in the area of the glass ceramic plate, which can follow the temperature changes of the glass ceramic plate sufficiently quickly. Long-term temperature changes on the temperature sensor, which are conditioned by the delay in the glass ceramic plate, can thus be reduced to a negligible level.

In this manner, it is provided, in accordance with one embodiment, that the distance as a minimal value is selected to be large enough that the short-term temperature changes of the heat coils or the halogen lamps arising during the switching on and switching off have no influence, or only a negligible influence, on the temperature sensor, while the maximal value of the distance is so selected that the delay conditioned by the thermal conductivity of the glass ceramic plate is still small enough to obtain a control characteristic with low hysteresis. For this distance "x", values of from 3 mm to 6 mm have proven sufficient.

The influence of the thermal conductivity in the glass ceramic plate and the delayed heating of the temperature sensor on the control behavior conditioned thereby can be further reduced through the fact that the recess for the temperature sensor is positioned in a protrusion on the surrounding wall of the insulation support, which projects into the internal space of the insulation support, and abuts on the lower side of the glass ceramic plate. By this means, the temperature sensor is shifted closer to the center of the heating zone, so that it can follow the temperature changes of the glass ceramic plate more rapidly.

A good thermally conducting connection between the temperature sensor and the glass ceramic plate is obtained, in accordance with one simple embodiment, from the fact that the insulation support comprises soft, elastic material, and that the recess is pressed by the temperature itself toward the upper side of the insulation support which is oriented to the lower side of the glass ceramic plate. A temperature-dependent resistor, which can be included in the control circuit in a simple manner, is preferably used as a temperature sensor. As a result, only one biaxial connecting lead is needed between the temperature sensor and the control circuit positioned outside the insulation support.

BRIEF DESCRIPTION OF THE DRAWING

The invention will now be illustrated in greater detail by means of examples of execution schematically represented in the drawings which show the following.

DESCRIPTION OF PREFERRED EMBODIMENTS

Figure 1:
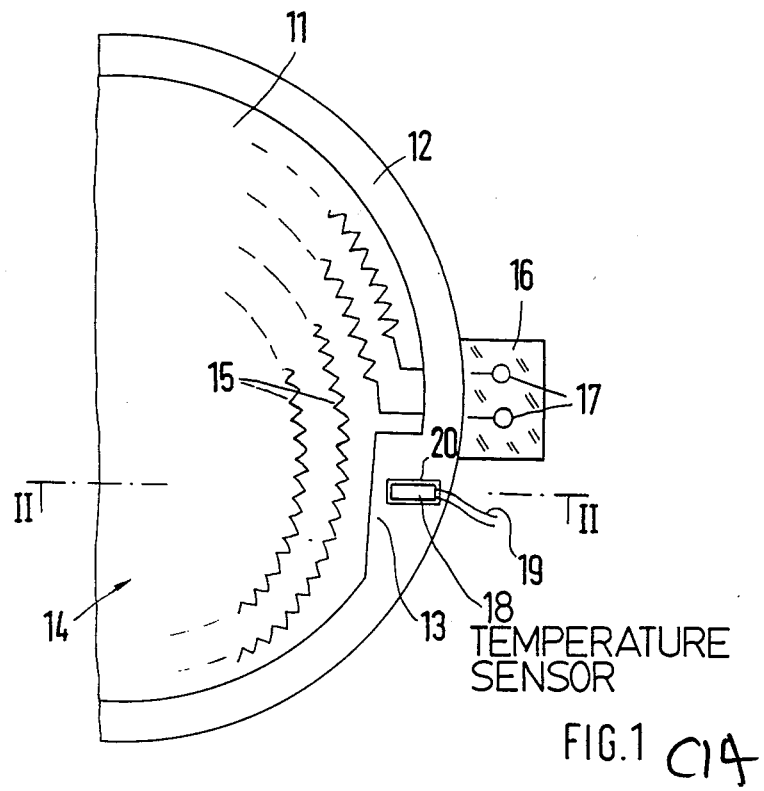
FIG. 1: a partial top view of a device of this invention with insulation supported heat coils, with the glass ceramic plate removed.
Figure 2:
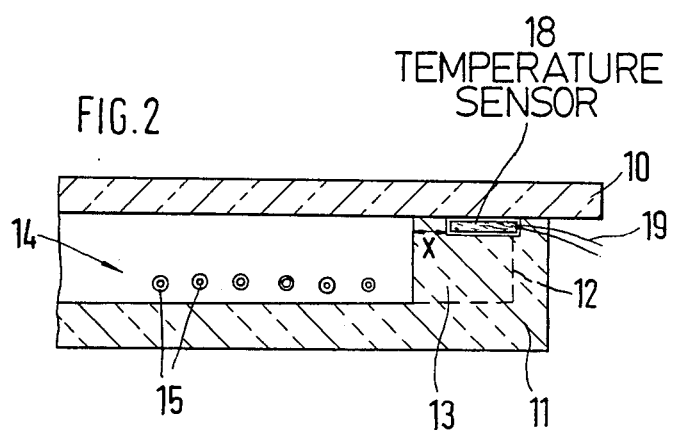
FIG. 2: a side partial section along the line II—II of FIG. 1, but with the glass ceramic plate in place.

In the example of execution in accordance with FIGS. 1 and 2, the heating coils (15) are positioned in the internal space (14) of the cylindrical vessel-like insulation support (11). The surrounding wall (12) of the insulation support (11) encloses the internal space (14) in an insulated manner, since the insulation support (11) comprises effectively thermal insulating material. The heating coils (15) are connected to the connections (17), which are positioned on the connecting block (16). The control circuit, which is connected with both connections (19) of the temperature sensor (18) in the form of a temperature-dependent resistor by means of a biaxial connecting line, takes care of supplying the heat coils (15).

The surrounding wall (12), in the connection area of the heating coils (15), supports the projection (13), which projects into the internal space (14) of the insulation support (11). As the partial section in accordance with FIG. 2 shows, the glass ceramic plate (10) lies on the surrounding wall (12) and the projection (13) of the insulation support (11). The temperature sensor (18) is placed into the insert or impressed recess (20) on the upper side of the projection (13), and is in thermally-conductive connection with the lower side of the glass ceramic plate (10). In this manner, the temperature sensor (18) is indirectly held on the lower side of the glass ceramic plate (10) under spring tension, in order to keep the thermal transition resistance between the glass ceramic plate (10) and the temperature sensor (18) low. In this manner, the temperature sensor (18) can also impress itself into the recess (20) into the projection (13) or the surrounding wall (12) of the insulation support (11), if this comprises soft, elastic material or supports a corresponding overlay.

The distance "x" of the temperature sensor (18) from the internal space (14) of the insulation support (11) is decisive for the dynamics of the control behavior. The distance "x" must be at least large enough so that the irradiation proceeding from the heating coils (15) does not directly reach the temperature sensor (18), so that the influence on the temperature sensor relative to the heating, through the heating by means of the thermal conductivity of the glass ceramic plate, is negligible. The distance "x" should also, however, not be too great, so that no long-term temperature changes on the temperature sensor (18), which would lead to a control characteristic with greater hysteresis in the heating of the temperature sensor, arise through the thermal conductivity of the glass ceramic plate (10). The distance "x" is preferably from 3 mm to 6 mm. The heating of glass ceramic plate (10) up to the temperature sensor (18) should not last too long, so that the control circuit does not delay, and so that, in event of a too-late switching off of the heating coils (15), excess oscillations would arise in the temperature of the glass ceramic plate (10). The distance "x" therefore allows the dynamic in the control behavior to be adjusted in a simple manner, and to thus be optimized, so that both the temperature changes in the heating coils (15) or the halogen lamps (21) conditioned by the switching on and switching off of the heating, as well as delays in the heating of the temperature sensor conditioned by the thermal conductivity of the glass ceramic plate (10), no longer have a disturbing influence, so that an adequate control precision can be achieved.

Figure 3:
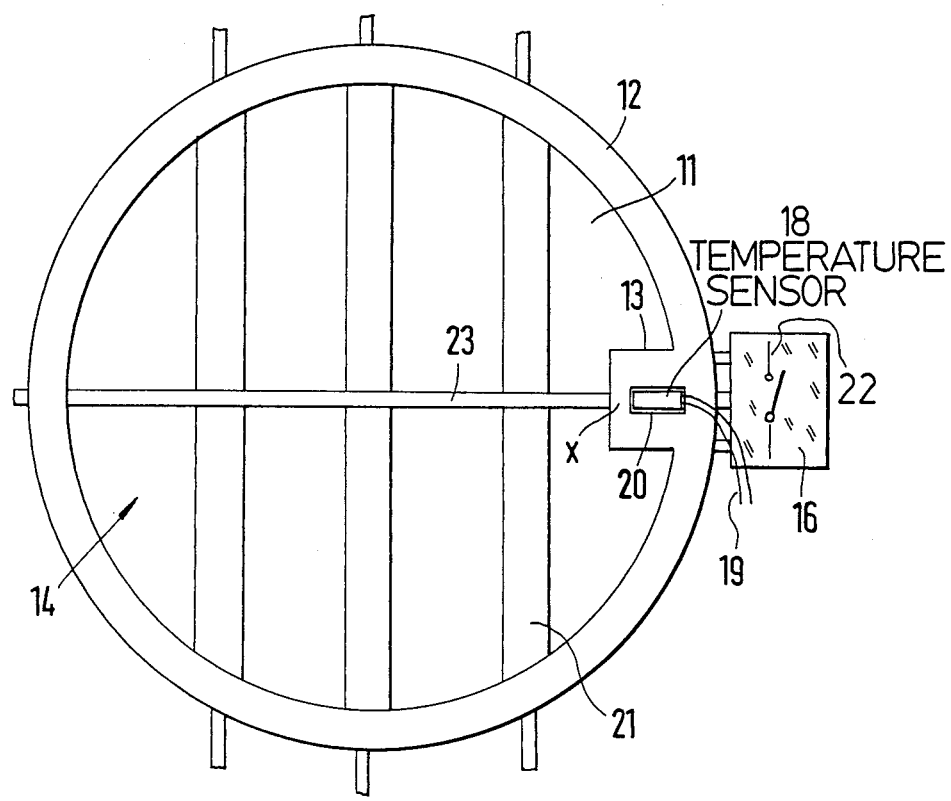
FIG. 3: a top view of a device having an insulation support and halogen lamps.

In the example of execution in accordance with FIG. 3, three halogen lamps (21) positioned parallel to one another are accommodated in the internal space (14) of the insulation support (11). The bar protector (23) covers the halogen lamps (21) and controls the security switch (22) in the connecting block (16). The temperature sensor (18) is inserted into the recess (20) of the projection (13) and, for the distance "x" to the internal space (14) of the insulation support (11), there apply the same explanations as for the example of execution in accordance with FIGS. 1 and 2. The glass ceramic plate covers the insulation support (11), and is supported on the surrounding wall (12) and the projection (13), whereby the thermally conductive connection between the lower side of the glass ceramic plate and the temperature sensor (18) is produced. In this manner the insulation support (11) is again retained against the glass ceramic plate by means of spring tension.

We claim:

1. In a device for determining the temperature of a glass ceramic plate heated by at least one of heating coils and halogen lamps with a temperature sensor which emits a signal for a control circuit corresponding to the temperature of the glass ceramic plate, in which said at least one of heating coils and halogen lamps is positioned in an internal space of an insulation support, and in which a surrounding wall of an insulation support abuts on the glass ceramic plate heated by radiation of said at least one of heating coils and halogen lamps, the improvement comprising: said temperature sensor (18) being positioned in a recess (20) in said surrounding wall (12) of said insulation support (11), and being in thermally conductive contact with a lower side of said glass ceramic plate (10), and said recess (20) for said temperature sensor (18) being positioned at a distance (x) from an internal space (14) of said insulation support (11), said distance (X) being between 3 mm and 6 mm, by which placement dynamics of control behavior are adjusted to a low hysteresis.

2. A device in accordance with claim 1, characterized in that said recess (20) for said temperature sensor (18) is positioned in a projection (13) of said surrounding wall (12) of said insulation support (11), which projects into said internal space (14) of said insulation support (11), and abuts on said lower side of said glass ceramic plate (10).

3. A device in accordance with claim 2, characterized in that said insulation support (11) comprises soft, elastic material, and that said recess (20) is impressed by said temperature sensor (18) into an upper side of said insulation support (11) which is oriented toward said lower side of said glass ceramic plate (10).

4. A device in accordance with claim 3, characterized in that said distance (x) as a minimum value is selected to be large enough that short-term temperature changes of said at least one of heating coils (15) and halogen lamps (21) arising during one of a switching on and a switching off have at most only a negligible influence on said temperature sensor (18), while a maximum value of said distance (x) is so selected, that a delay conditioned by a thermal conductivity of said glass ceramic plate (10) is low enough to achieve said control behavior with said low hysteresis.

5. A device in accordance with claim 2, characterized in that a temperature-dependent resistor is used as said temperature sensor (18).

6. A device in accordance with claim 5, characterized in that said distance (x) as a minimum value is selected to be large enough that short-term temperature changes of said at least one of said heating coils (15) and said halogen lamps (21) arising during one of a switching on and a switching off have at most only a negligible influence on said temperature sensor (18), while a maximum value of said distance (x) is so selected, that a delay conditioned by a thermal conductivity of said glass ceramic plate (10) is low enough to achieve said control behavior with said low hysteresis.

7. A device in accordance with claim 1, characterized in that said insulation support (11) comprises soft, elastic material, and that said recess (20) is impressed by said temperature sensor (18) into an upper side of said insulation support (11) which is oriented toward said lower side of said glass ceramic plate (10).

8. A device in accordance with claim 1, characterized in that a temperature-dependent resistor is used as said temperature sensor (18).

9. A device in accordance with claim 1, characterized in that said distance (x) as a minimum value is selected to be large enough that short-term temperature changes of said at least one of said heating coils (15) and said halogen lamps (21) arising during one of a switching on and a switching off have at most only a negligible influence on said temperature sensor (18), while a maximum value of said distance (x) is so selected, that a delay conditioned by a thermal conductivity of said glass ceramic plate (10) is low enough to achieve said control behavior with said low hysteresis.

* * * * *